United States Patent
Hauske et al.

(10) Patent No.: US 9,083,498 B2
(45) Date of Patent: Jul. 14, 2015

(54) METHOD AND DEVICE FOR PROCESSING DATA AND COMMUNICATION SYSTEM COMPRISING SUCH DEVICE

(75) Inventors: Fabian Hauske, Wörthsee (DE); Maxim Kuschnerov, München (DE); Berthold Lankl, Egmating (DE); Kittipong Piyawanno, München (DE); Bernhard Spinnler, Oberhaching (DE)

(73) Assignee: Xieon Networks S.a.r.l., Luxemburg (LU)

( * ) Notice: Subject to any disclaimer, the term of this patent is extended or adjusted under 35 U.S.C. 154(b) by 556 days.

(21) Appl. No.: 12/865,475

(22) PCT Filed: Jan. 27, 2009

(86) PCT No.: PCT/EP2009/050885
§ 371 (c)(1),
(2), (4) Date: Aug. 27, 2010

(87) PCT Pub. No.: WO2009/095382
PCT Pub. Date: Aug. 6, 2009

(65) Prior Publication Data
US 2011/0002423 A1    Jan. 6, 2011

(30) Foreign Application Priority Data

Jan. 30, 2008  (EP) .................................... 08001750

(51) Int. Cl.
*H04L 7/00* (2006.01)
*H04L 7/033* (2006.01)

(52) U.S. Cl.
CPC ............ *H04L 7/0054* (2013.01); *H04L 7/0331* (2013.01)

(58) Field of Classification Search
CPC ........... H04L 7/02; H04L 7/04; H04L 7/0054; H04L 7/0331
USPC ........................... 375/342–343, 355, 362, 371
See application file for complete search history.

(56) References Cited

U.S. PATENT DOCUMENTS

| | | | | |
|---|---|---|---|---|
| 5,533,066 A * | 7/1996 | Yamaguchi et al. | .......... | 375/341 |
| 5,761,211 A * | 6/1998 | Yamaguchi et al. | .......... | 714/707 |
| 5,872,818 A | 2/1999 | Choi | | |
| 6,052,423 A * | 4/2000 | Blois et al. | ..................... | 375/355 |
| 6,130,920 A * | 10/2000 | Powell et al. | ................. | 375/343 |
| 6,389,088 B1 | 5/2002 | Blois et al. | | |
| 6,731,697 B1 | 5/2004 | Boccuzzi et al. | | |
| 6,829,291 B1 * | 12/2004 | Imaizumi | ..................... | 375/150 |
| 7,321,248 B2 * | 1/2008 | Zhang | ........................ | 327/149 |
| 7,535,974 B1 * | 5/2009 | Shirali | ........................ | 375/297 |
| 2003/0031275 A1 * | 2/2003 | Min et al. | ...................... | 375/326 |
| 2004/0019837 A1 | 1/2004 | Nicholls et al. | | |
| 2004/0223568 A1 * | 11/2004 | Liu | ............................... | 375/355 |
| 2005/0046456 A1 * | 3/2005 | d'Haene et al. | ............... | 327/165 |
| 2007/0025430 A1 * | 2/2007 | Rasmussen | .................. | 375/150 |
| 2007/0025477 A1 * | 2/2007 | Rasmussen | .................. | 375/343 |
| 2007/0248193 A1 * | 10/2007 | Ray et al. | ..................... | 375/343 |
| 2010/0042559 A1 | 2/2010 | Anderson et al. | | |
| 2010/0150289 A1 * | 6/2010 | Sunaga et al. | ................. | 375/371 |
| 2013/0182670 A1 * | 7/2013 | Kim et al. | ..................... | 370/329 |

FOREIGN PATENT DOCUMENTS

| | | |
|---|---|---|
| EP | 1287635 A1 | 3/2003 |
| EP | 1850517 A1 | 10/2007 |
| WO | 0195553 A1 | 12/2001 |
| WO | 2007041807 A1 | 4/2007 |

OTHER PUBLICATIONS

Lee et al, Reception Apparatus Having Symbol Synchronization Circuit, Capable of Simplifying Synchronization Circuit,Jun. 21, 2006, Derwent No. 2007-227937, Publication No. KR 2006069037.*

* cited by examiner

*Primary Examiner* — Jean B Corrielus
(74) *Attorney, Agent, or Firm* — Nelson Mullins Riley & Scarborough LLP (57) ABSTRACT

A method and a device are provided for data processing. The data contains symbols and a control parameter is determined based on a correlation property of the symbols of the data. In this manner signal recovery is achieved that is robust against any kind of distortion and is fast enough to track time varying clocking disturbances. Further, a communication system is provided containing such a device.

13 Claims, 9 Drawing Sheets

METHOD AND DEVICE FOR PROCESSING DATA AND COMMUNICATION SYSTEM COMPRISING SUCH DEVICE

BACKGROUND OF THE INVENTION

Field of the Invention

The invention relates to a method and to a device for processing data and to a communication system comprising such a device.

To increase the bandwidth efficiency and robustness against distortions, optical communication requires high order modulation, e.g., 100 Gbit/s PolMUX-QPSK (polarization multiplex quaternary phase shift keying) employing both polarizations and complex signal constellations in each polarization for information transport. Such modulation of high order allows a reduction of the symbol rate to 100 GBit/s:4=25 GBit/s, which increases a robustness against optical distortions like chromatic dispersion (CD) or polarization mode dispersion (PMD). This approach also reduces performance requirements towards the hardware for electrical post processing in the receiver.

Figure 1:
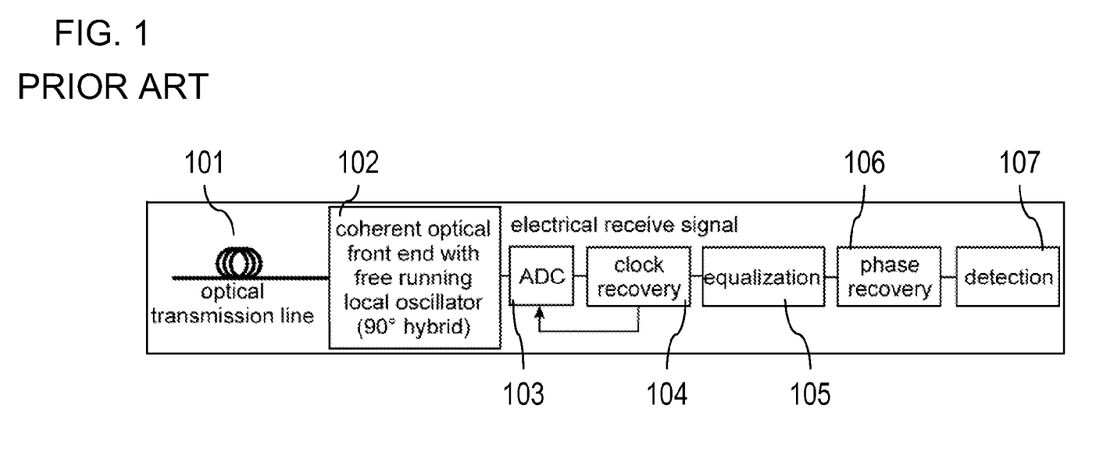
FIG. 1 shows an exemplary setup of a system providing coherent demodulation of optical communications signals.

FIG. 1 shows a exemplary setup of a system providing coherent demodulation of optical communications signals.

An optical transmission line 101 is fed to a coherent optical front end comprising a free running local oscillator ("90°-hybrid") 102, the output of which is processed by an analog/digital-converter 103 providing a sampled and quantized representation of the optical field as an electrical receive signal. Said signal may comprise statistic noise distortions and deterministic channel distortions. The latter can be compensated by an equalizer 105. A clock recovery 104 tracks and corrects phase and frequency offsets between the transmitter's and the receiver's symbol clocks.

The clock recovery 104 has a feedback loop towards the analog/digital-converter 103. A phase recovery 106 is deployed subsequent to the equalization 105 and the output of the phase recovery 106 is fed to a detection unit 107 for processing/detecting the signal received.

For economic reasons, the signal processing including the clock recovery 104, the equalization 105, the phase recovery 106 and the detection 107, preferably processes digital signals, i.e. subsequent to the analog/digital-converter 103 the receiver processes digital data. However, processing digital data requires a significant high processing speed at the receiver based on the symbol rate of the optical data received. According to such high requirements towards processing speed, digital data at the receiver may preferably be processed by methods of limited or low complexity.

BRIEF SUMMARY OF THE INVENTION

The problem to be solved is to overcome the disadvantages as stated before and in particular to provide signal recovery, in particular timing and/or clock recovery, that is robust against any kind of distortion and that is fast enough to track time varying clocking disturbances. Furthermore, the clock recovery should be able to cope with a 2-fold over-sampling input of the analog/digital-converter, wherein such input implies that the analog/digital-converter provides two digital samples per symbol.

This problem is solved according to the features of the independent claims. Further embodiments result from the depending claims.

In order to overcome this problem, a method for processing data is provided wherein said data comprises symbols;

wherein a control parameter is determined based on a correlation property of the symbols of said data.

It is to be noted that a symbol may in particular be any information conveyed and/or associated with the data. A symbol may be associated with a modulation technique conveying information via symbols, e.g., predetermined coordinates within constellation diagrams (as, e.g., in quadrature amplitude modulation).

Advantageously, said control parameter can be evaluated based on the correlation property of the symbols.

The correlation property may in particular be associated with a symmetry criterion.

The approach provided allows an implementation complexity in particular of a (digital) receiver enabling high processing speed. It may be operated at a sampling rate of two samples per symbol and it may require no further up-sampling or interpolation.

Further, the approach suggested is robust against channel distortions and sufficiently fast to track and/or compensate clocking disturbances.

Data may comprise any kind of signal or data to be provided from a component or element directly or indirectly via a fixed line or a radio interface or connection. The data may in particular be digital data provided, e.g., by an analog/digital-converter.

In an embodiment, a phase of the data is modified pursuant to the control parameter.

Hence, the phase may be shifted in order to obtain a more balanced correlation.

In another embodiment, the phase of the data is modified by controlling a sampling phase via said control parameter.

Said sampling phase may be controlled by shifting the sampling phase of an analog/digital-converter by shifting the sampling phase of an interpolator that is preferably arranged subsequent to the analog/digital-converter.

In a further embodiment, the phase of the data is modified by controlling an interpolator or an interpolation via said control parameter.

In a next embodiment, the data is processed to detect a signal, in particular a timing signal or a clock signal.

The approach may in particular be used for clock recovery applications in a receiver.

It is also an embodiment that the input signal is a digital signal, in particular a signal provided by an analog/digital-converter.

Pursuant to another embodiment, the input signal comprises at least two samples per symbol.

According to an embodiment, the correlation property of the symbols is based on a histogram. Preferably, the control parameter may be determined based on at least one symmetry property of said histogram.

The histogram can be a matrix. It is further possible that the histogram or the matrix or portions thereof are weighted or filtered in order to bring out relevant portions. This may result in an improved controlling.

According to another embodiment, the control parameter is determined in order to improve the at least one symmetry property of said histogram.

Hence, an iterative evaluation may apply in order to subsequently obtain (and hence provide) an improved (or optimized) value for the control parameter.

In yet another embodiment, the control parameter is determined according to $$R = \Sigma_{i=1}^{q} \Sigma_{j=1}^{i} (H(i,j) - H(j,i))$$

wherein

R denotes the control parameter;

q denotes a number of quantization bins;

H(i, j) refers to a value of a bin in the histogram with coordinates defined by a row i and a column j.

According to a next embodiment, the control parameter is determined based on a data block. The data block may comprise a predetermined number of symbols.

Hence a given length of said data block (input signal) may be used, e.g., to obtain a clock signal or to synchronize on said clock signal, i.e. for clock-recovery purposes.

Pursuant to yet an embodiment, the approach may be used in a digital radio or mobile communication.

The problem stated above is also solved by a device for data processing comprising a processor unit and/or a hard-wired circuit (e.g., an ASIC or an FPGA) that is equipped and/or arranged such that the method as described herein is executable thereon.

According to an embodiment, the device is a communication device, in particular a receiver of an optical communication system.

The problem stated supra is further solved by a communication system comprising the device as described herein.

The communication system may in particular be an optical communication system.

DESCRIPTION OF THE INVENTION

For an exemplary sampling rate of 2 samples per symbol, a correlation between two adjacent symbols is evaluated within a block of a digital input signal comprising several samples. Such block of samples can be determined to have a given length in order to, e.g., recover a timing information, in particular a clock signal. The block may be of a fixed length or it can be of variable length depending on the signal recovery itself: E.g., if the signal (clock) could be determined with a predetermined certainty, the process of recovery may end.

Correlation properties could be read, e.g., from a 2-dimensional histogram. From symmetry properties of such histogram, a control parameter can be derived, which relates to the sampling phase. This control parameter can either control the sampling phase of an analog/digital-converter providing the samples or it may control an interpolator.

For the approach provided herein, advantageously the following requirements and/or options are met or fulfilled:

(1) The sampling rate amounts to at least 2 samples per symbol.

(2) The number of samples per evaluated block is preferably larger than 2. Larger blocks lead to improved sampling phase estimations, especially in presence of strong signal distortions.

(3) Correlation properties may be evaluated with or without building up or utilization of a histogram.

(4) Histograms with higher orders than dimension 2 may be utilized.

The signal recovery, in particular timing information recovery and/or clock recovery suggested may be applied in any digital communication system, e.g., mobile or radio communication. It may in particular be used in high speed transmission systems, e.g., in electrical receivers of optical (ultra) long haul and/or metro communication systems where blind timing phase estimation is required.

The input signal fed to the clock recovery is the digital sequence from the analog/digital-converter (see FIG. 1). Such input signal can be referred to as data processed according to this approach.

Figure 2:
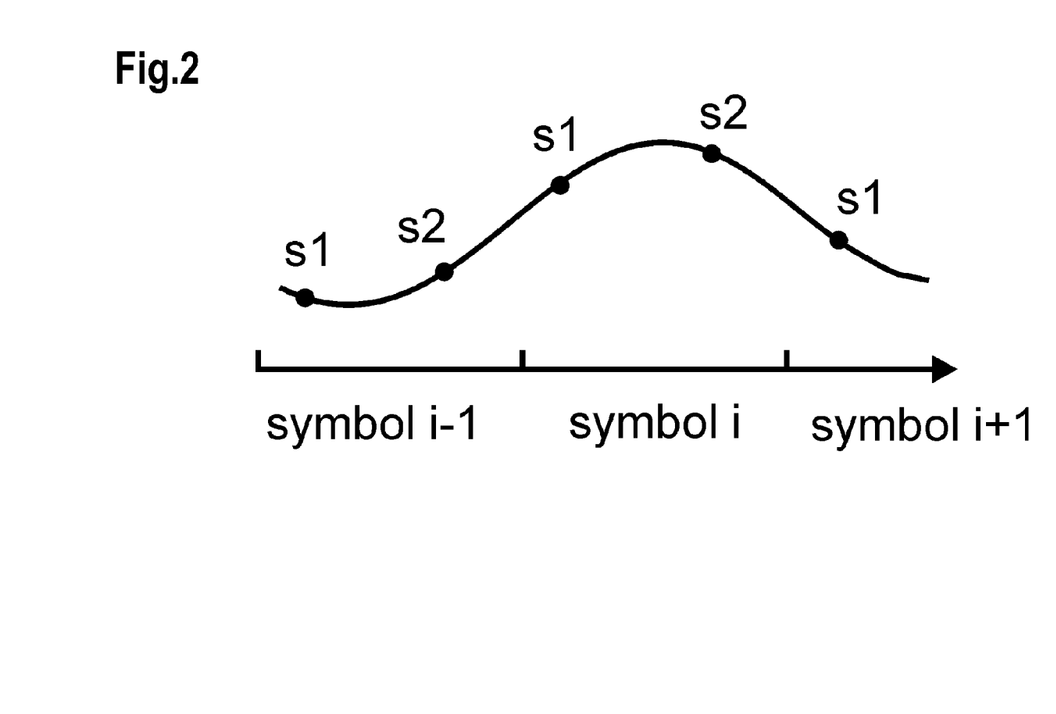
FIG. 2 shows a sampling of an analogue receive signal in an analog/digital-converter for sampling points at [T/4; 3T/4]
Figure 3:
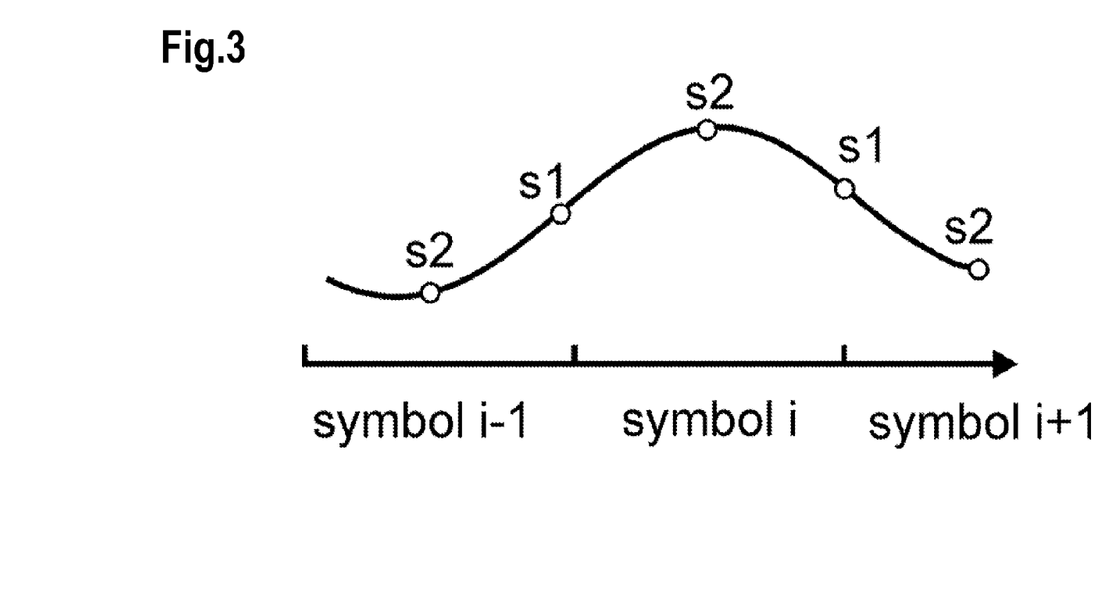
FIG. 3 shows a sampling of an analogue receive signal in an analog/digital-converter for sampling points at [0; T/2]

At 2-fold over-sampling, every symbol may be represented by two (substantially) equally spaced samples s1 and s2 (see FIG. 2 and FIG. 3). Each symbol has a duration of T, which leads to a distance of T/2 between two adjacent samples.

It is noted that the distance between samples that is used for the axis of the histogram can differ from T/2. Such distance may in particular amount to kT/2 (k being a natural number). Hence, samples do not have to be adjacent to one another.

It is an option to pre-process the samples, e.g., filtering, weighting, processing mean values, cumulating samples. In particular, a running mean may be determined across n even and odd samples symmetrically around the symbol to be determined, wherein n is proportional to a number of predecessor samples as well as successor samples.

Figure 9:
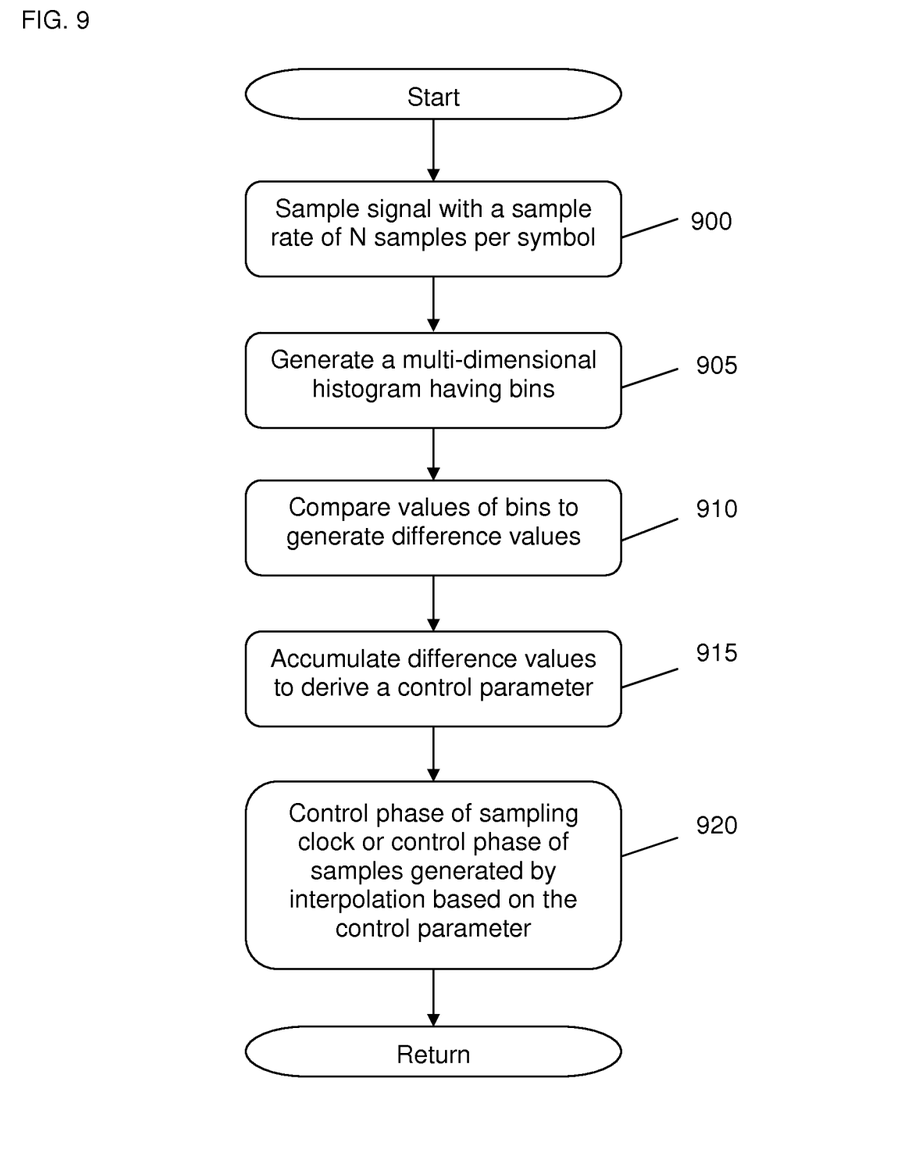
FIG. 9 shows a flowchart of steps performed by an illustrated embodiment.

From a data block comprising a sufficient amount of N digital samples (N is a multiple of the over-sampling factor) (see step 900 in FIG. 9), a histogram is generated, where the values of the first sample s1 are aligned with the x-axis and the values of s2 are aligned with the y-axis, spanning a 2-dimensional coordinate system (step 905 in FIG. 9). The length of the according axes may be defined by a number of quantization steps of the analog/digital-converter.

For every pair of samples (s1,s2) the relative frequency of occurrence within the data block is evaluated. The relative frequency represents a common probability density function (PDF) of the amplitude distribution of both samples s1 and s2.

FIG. 2 shows samples S1 and S2 at a sampling phase of [T/4; 3T/4] and FIG. 3 shows samples S1 and S2 at a sampling phase of [0; T/2].

According to the example shown in FIG. 2, both samples S1 and S2 show similar amplitude values. Hence, a resulting histogram is substantially symmetric to the line of origin between both axes.

According to the example shown in FIG. 3, the samples s2 show substantially minimum and maximum values and the samples s1 show values in between these extreme values.

Figure 4:
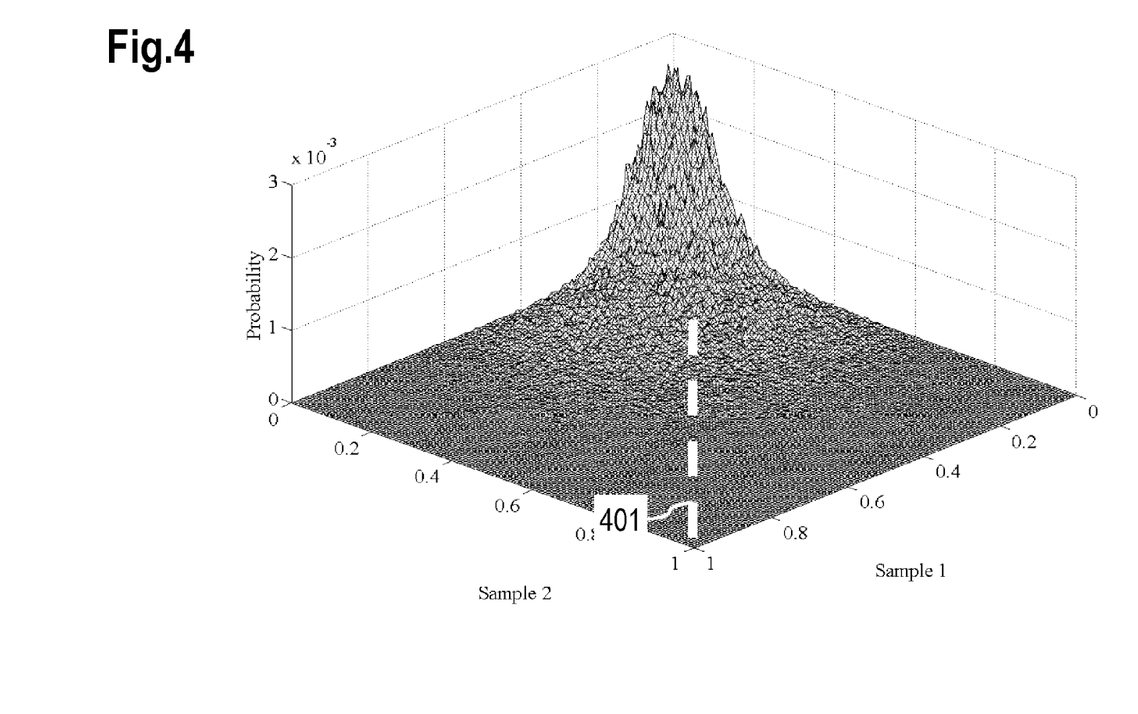
FIG. 4 shows a histogram according to the example shown in FIG. 2.

A corresponding histogram for the sampling phase [T/4; 3T/4] according to FIG. 2 is shown in FIG. 4 depicting a symmetry to the line of origin 401.

Figure 5:
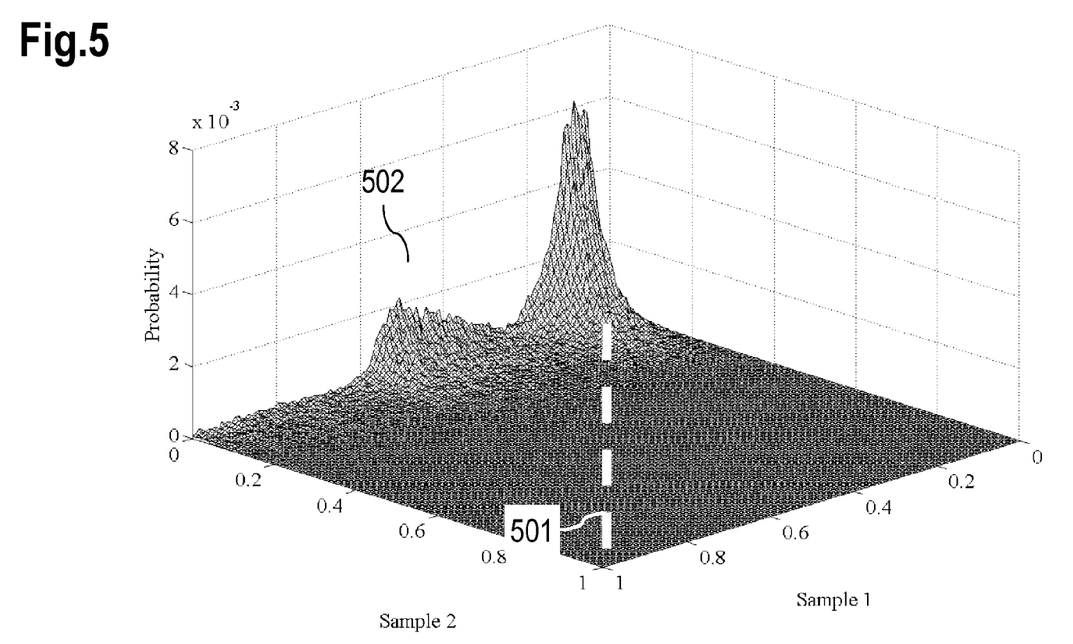
FIG. 5 shows a histogram according to the example shown in FIG. 3.

A corresponding histogram of asymmetric shape for the sampling phase [0; T/2] according to FIG. 3 is shown in FIG. 5. This histogram shows a stronger weight 502 in the left half plane. Hence, a resulting control parameter may indicate an early sampling phase. Similar to FIG. 4, FIG. 5 comprises a line of origin 501.

Because dominant deterministic channel distortions like chromatic dispersion are substantially symmetric with respect to the pulse centre (raising flank exhibits same distortion as falling flank), the resulting histogram inherits a symmetric shape for balanced sampling points with respect to the pulse centre. Hence, even when strong distortions are present, a symmetric shape may arise in the case of the sampling phase set to [T/4; 3T/4].

In case of an early or late sampling phase, the according histogram becomes asymmetric, which leads to the desired control parameter indicating to modify the phase in order to reach the symmetric case (again). Hence, this technique is robust against strong channel impairment, noise, interference and/or distortion.

A control parameter may be determined by comparing two bins of the histogram with a symmetric position in respect to the line of origin. A difference of the likelihood of both bins may be determined (step 910 in FIG. 9) and all such differences in the histogram can be accumulated in order to obtain the control parameter, that detects by its sign whether the weight of the histogram is shifted to the left (negative sign) or to the right (positive sign) half plane (step 915 in FIG. 9). This corresponds to an early or late sampling phase.

The bin mentioned may refer to a 2-dimensional field determined by the quantization range of the analog/digital-converter providing samples of certain values.

In particular, the control parameter may be calculated as follows:

$$R = \Sum_{i=1}^{q} \Sum_{j=1}^{i} (H(i,j) - H(j,i)),$$

where
q denotes a number of quantization bins,
H (i, j) refers to a value of a bin in the histogram with coordinates defined by row i and column j.

In case of a histogram weight tends towards the left half plane, the control parameter R is below 0 (see FIG. 5) and the control parameter R is above 0 for a weight towards the right half plane.

Figure 6:
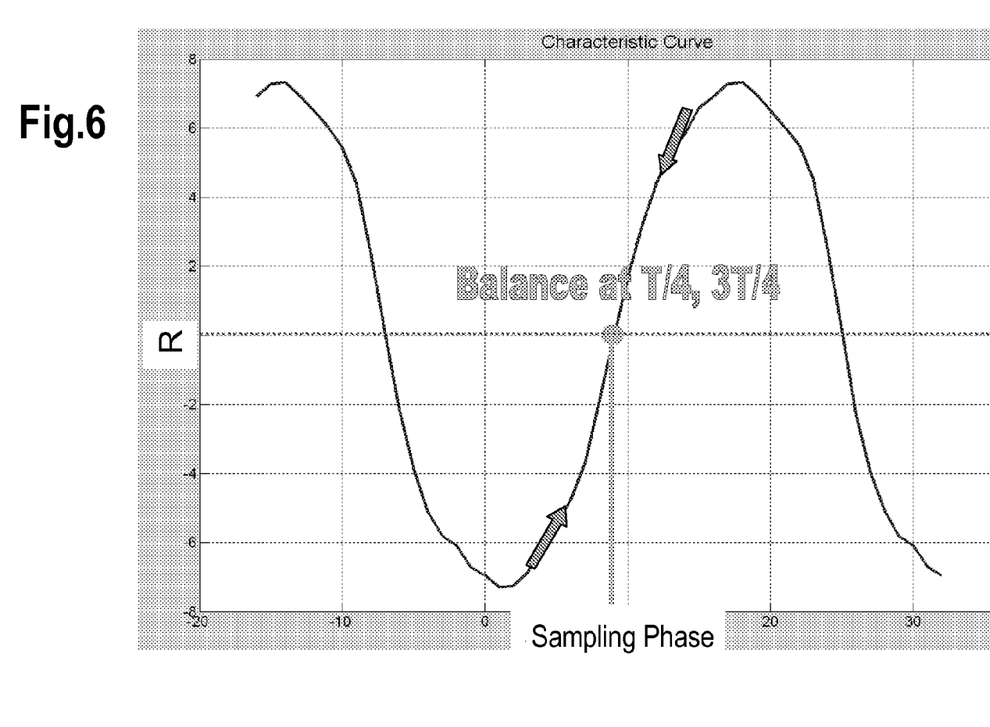
FIG. 6 shows an exemplary function of the control parameter R depending on a sampling phase for a symbol duration of 30 ps, wherein said function shows a stable operating point for the balanced sampling phase of [T/4; 3T/4]

FIG. 6 shows an exemplary function of the control parameter R depending on a sampling phase for a symbol duration of 30 ps.

The function shows a stable operating point for the balanced sampling phase of [T/4; 3T/4].

Figure 7A:
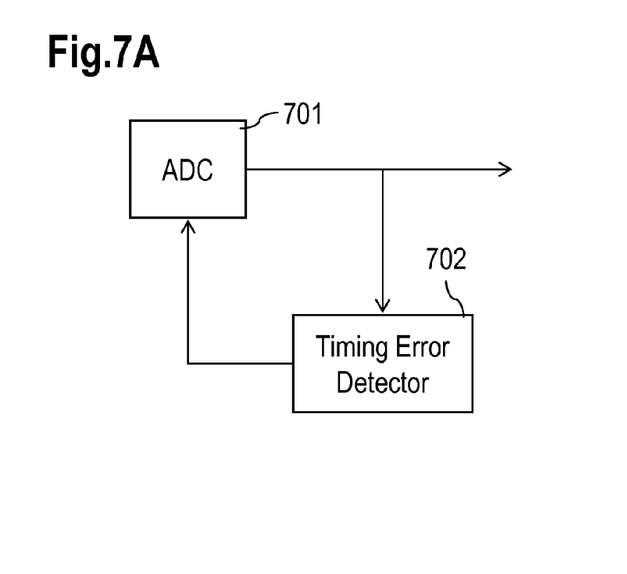
FIG. 7A shows how the control parameter can be utilized in a feedback structure for timing recovery purposes.

If a balanced sampling phase is required, the control parameter may directly drive the sampling phase in the analog/digital-converter without any additional measure. In case a subsequent equalization needs a different sampling value, this could be achieved by a digital interpolator, which shifts the received data to the desired sampling phase (step 920 in FIG. 9). A feedback-based timing recovery is depicted in FIG. 7A comprising an analog/digital-converter ADC 701 providing an output to a Timing Error Detector 702 that feeds back a control parameter to the analog/digital-converter ADC 701.

Figure 7B:
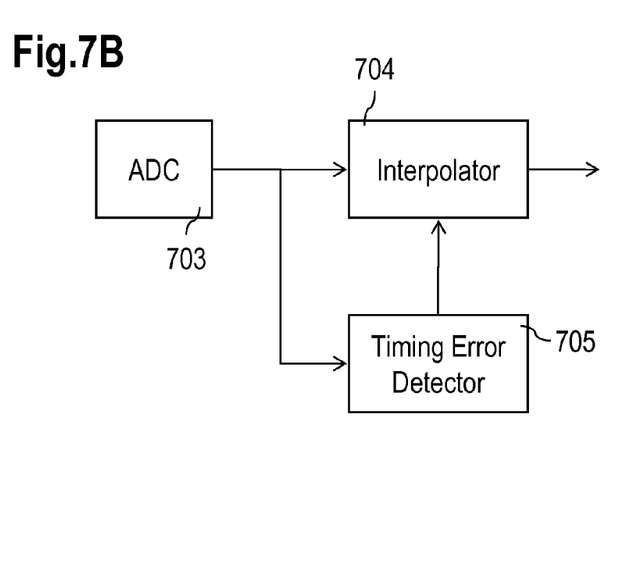
FIG. 7B shows how the control parameter can be utilized in a feed forward structure for timing recovery purposes.

As shown in FIG. 7B, the control parameter R can also be used to control an interpolator 704 in a feed forward structure, leaving an analog/digital-converter ADC 703 unaffected (step 920 in FIG. 9). In FIG. 7B the output signal provided by the analog/digital-converter ADC 703 is fed to the Interpolator 704 and to a Timing Error Detector 705, wherein the Timing Error Detector 705 forwards said control parameter to the Interpolator 704.

Figure 8:
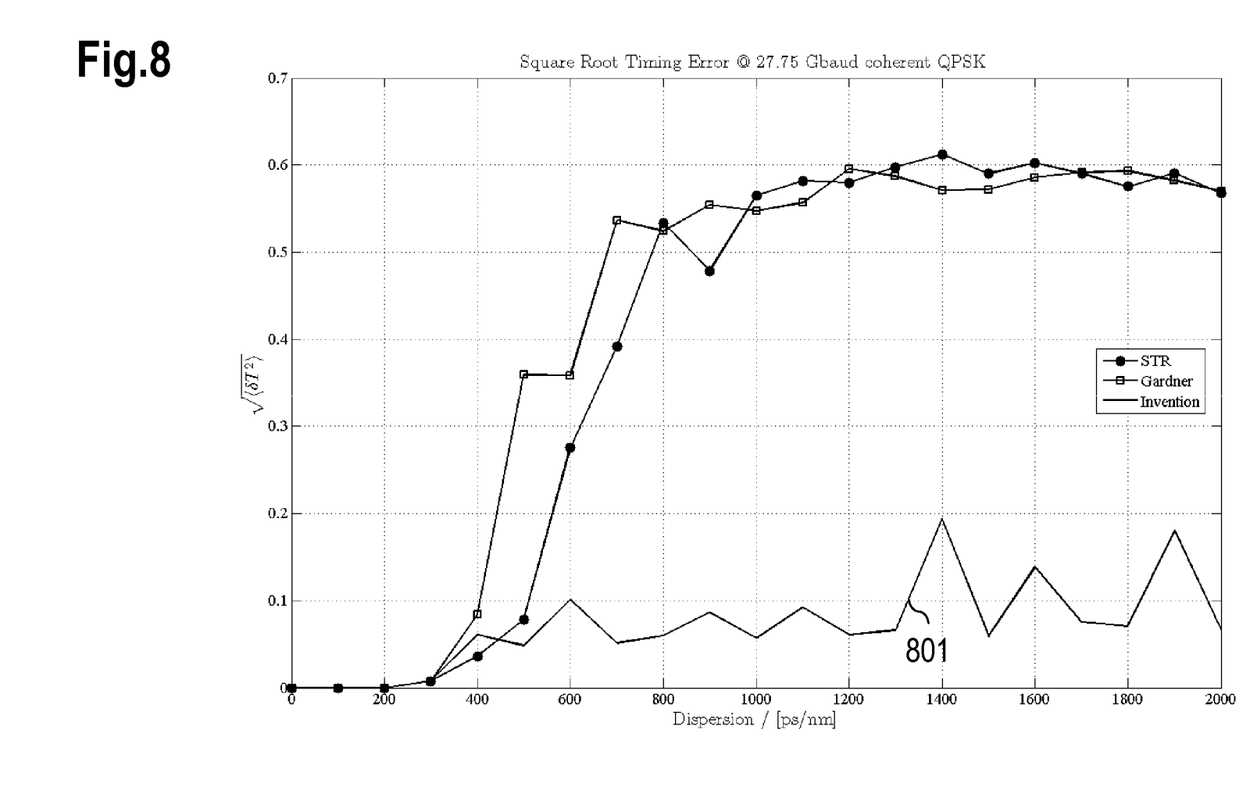
FIG. 8 shows exemplary graphs comparing the approach presented herein with other schemes, pointing out a phase deviation over a chromatic dispersion.

Advantageously, the approach suggested allows significant improved results compared to known technologies as is shown an exemplary graph according to FIG. 8 for 111 Gbit/s PolMux QPSK.

The various graphs show a phase deviation (y-axis) in view of a dispersion (in ps/nm). A graph 801 depicts the result that is obtained by the approach presented herein.

Advantageously, the approach suggested can be realized based on simple mathematical operations like binary additions, which allow a reduced implementation complexity and therefore applications to be run at a high processing speed within the receiver. Furthermore, block-wise processing allows a high degree of parallelization, which even enables an implementation in FPGAs.

Hence, the solution described may be implemented, e.g., in an ASIC, FPGA or in a device utilizing such or a similar technology.

The technology can be used in receivers with coherent demodulation at high data rates in optical communication systems with digital signal processing at the receiver for equalization purposes utilizing, e.g., 100 Gbit/s PolMUX-QPSK (25 GBaud) systems.

The utilization of the concept provided is not limited to optical communication systems or to coherent demodulation. It may in particular be applied to any digital communication system.

List Of Abbreviations
ADC Analogue-to-Digital Converter
ASIC Application Specific Integrated Circuit
BER Bit Error Rate
CD Chromatic Dispersion
FPGA Field Programmable Gate Array
OFC Optical Fiber Communication (conference)
PDF Probability Density Function
PLL Phase Locked Loop
PMD Polarization Mode Dispersion
PolMUX Polarization Multiplex
QPSK Quaternary Phase-Shift Keying

The invention claimed is:
1. A method for processing data, wherein said data corresponds to a sequence of symbols, comprising the steps of
sampling an electrical receive signal with a sample rate of N samples per symbol of said signal where N is greater than or equal to 2, and generating a sampled data signal;
generating a multi-dimensional histogram having bins wherein values for each of the N samples per symbol are aligned along a respective axis associated with a respective dimension and wherein each of the bins in the histogram is associated with a combination of N sample values for the N samples that are sampled per symbol and each bin has a value specifying a relative frequency of occurrence of the associated combination of values;
comparing values of bins of said samples in the histogram to generate difference values wherein the histogram has at least one symmetry property;
accumulating said difference values to derive a control parameter; and
controlling a phase of a sampling clock signal in relation to a phase of said data signal or controlling a phase of samples generated by interpolation of said samples based on said control parameter to improve the symmetry property of the histogram.

2. The method according to claim 1, wherein each symbol is sampled twice to product a first sample and a second sample.

3. The method according to claim 2, wherein the symbols are sampled with a phase difference between the first samples and second samples (s2) corresponding to one half of a symbol duration T/2 or to k times of one half of a symbol duration kT/2, where k is a natural number and T the symbol duration.

4. The method according to claim 2, wherein the control parameter is determined according to $$R = \Sigma_{i=1}^{q} \Sigma_{j=1}^{i} (H(i,j) - H(j,i))$$

wherein
- R denotes the control parameter;
- H denotes the histogram;
- i is a first in bin index of a first axis of the histogram;
- j is a second bin index of a second axis of the histogram; and
- q denotes a number of quantization bins.

5. The method according to claim 1, wherein the histogram or portions thereof are weighted or filtered.

6. The method according to claim 1, wherein a phase of the sampled data signal is modified pursuant to the control parameter.

7. The method according to claim 1, wherein the phase of the sampled data signal is modified by controlling a sampling phase of an analog/digital-converter by said control parameter.

8. The method according to claim 7, wherein the phase of the sampled data signal is modified by an interpolation on an interpolator, which is receiving the samples controlled by said control parameter.

9. The method according to claim 1, wherein the sampled data signal is processed to detect a digital signal to generate a timing signal or a sampling clock signal.

10. The method according to claim 1, wherein the control parameter is determined based on a data block comprising a predetermined number of symbols.

11. The method according to claim 1, wherein the method is provided for optical communication systems, digital radio or mobile communication.

12. A device for processing data comprising a processor unit and/or a hard-wired circuit that is configured such that the method according to claim 1 is executable thereon.

13. The device according to claim 12, wherein said device is a receiver of an optical communication system.

* * * * *